United States Patent [19]
Strong et al.

[11] Patent Number: 5,527,194
[45] Date of Patent: Jun. 18, 1996

[54] THRUST SENSOR FOR MARINE DRIVES

[75] Inventors: William A. Strong; Gerald E. Weitz; John W. Behara, all of Stillwater, Okla.

[73] Assignee: Brunswick Corporation, Lake Forest, Ill.

[21] Appl. No.: 191,272

[22] Filed: Feb. 2, 1994

[51] Int. Cl.[6] ................................................ B63H 5/10
[52] U.S. Cl. ........................ 440/80; 440/900; 73/862.049
[58] Field of Search ..................... 73/862.49; 440/79–81, 440/83, 76, 88, 900, 113; 384/609

[56] References Cited

U.S. PATENT DOCUMENTS

| | | | |
|---|---|---|---|
| 2,064,195 | 12/1936 | De Michelis | 416/129 A |
| 2,281,871 | 5/1942 | Corby, Jr. | 73/862.49 |
| 2,451,658 | 10/1948 | Bugatti | 384/609 |
| 3,087,330 | 4/1963 | Metzmeier | 73/862.49 |
| 4,302,196 | 11/1981 | Blanchard | 440/75 |
| 4,630,719 | 12/1986 | McCormick | 192/21 |
| 4,679,682 | 7/1987 | Gray, Jr. et al. | 192/21 |
| 4,869,121 | 9/1989 | Meisenburg | 74/323 |
| 4,871,334 | 10/1989 | McCormick | 440/89 |
| 4,897,058 | 1/1990 | McCormick | 440/80 |
| 5,230,644 | 7/1993 | Meisenburg et al. | 440/80 |
| 5,236,380 | 8/1993 | Schueller et al. | 440/76 |
| 5,249,995 | 10/1993 | Meisenburg et al. | 440/81 |
| 5,310,370 | 5/1994 | Onoue | 440/900 |

FOREIGN PATENT DOCUMENTS

| | | | |
|---|---|---|---|
| 1310472 | 3/1973 | United Kingdom | 440/81 |
| 9206890 | 4/1992 | WIPO | 73/862.49 |

*Primary Examiner*—Edwin L. Swinehart
*Attorney, Agent, or Firm*—Andrus, Sceales, Starke & Sawall

[57] ABSTRACT

In a marine drive (10), a nonrotational thrust sensing device (202 or 204) is placed between the stationary housing (26') and rotating propeller shaft (40' or 42') to measure the thrust output of a propeller (12 or 14) by measuring the equal and opposite force applied to the housing by the propeller shaft (40' or 42'). A thrust bearing (214 or 248) is situated between the rotating shaft and the nonrotating thrust sensing device. A thrust ring (246) and adapter (250) provide adoption of the thrust sensing device to a particular housing and shaft configuration. In a marine drive having counter rotating coaxial propeller shafts, first and second thrust sensors individually sense the thrust of inner and outer propeller shafts, respectively, to provide separate sensed thrust for each.

17 Claims, 5 Drawing Sheets

THRUST SENSOR FOR MARINE DRIVES

This invention relates to a marine propulsion system, and more particularly to an improved apparatus and method for sensing the thrust exerted by a marine propeller.

BACKGROUND OF THE INVENTION

The performance and thrust output of a marine drive unit is highly dependent on the design characteristics of the propeller. Variations in size, pitch, rake, number of blades, etc., greatly affect the thrust output, or performance, of a marine drive unit. Therefore, it is highly desirable to be able to accurately measure the thrust output for various propellers.

It is commonly known that in a marine drive unit, the thrust output of a propeller is of equal magnitude to the force applied to the opposite end of the propeller shaft against the marine drive housing. With this in mind, the thrust output of any propeller may be measured by the force of the shaft against the housing.

Prior to the present invention, individual strain gauges, made of fine, highly resistive wires, were carefully arranged and attached with epoxy to the longitudinal length of the propeller shaft. Normally, a total of four gauges were required to receive an acceptable signal. The four gauges were divided into two sets, each placed 180° apart on the shaft circumference. Within a set, one gauge was laid parallel to the axis, and the other, circumferentially. Further, each gauge was laid out sinusoidally to create four periods for additional sensitivity. However, since these strain gauges rotated with the propeller shaft, a slip ring assembly was required to transfer the signal created by the thrust of the propeller from the rotating strain gauges to stationary lead wires.

Each of the four strain gauges requires an associated slip ring, and each slip ring consists of three parts. The first part of a slip ring assembly is a signal conducting transfer material attached to the circumference of the shaft and electrically connected to the strain gauges. The second slip ring component is a signal conducting brush assembly which is stationary with respect to the rotating shaft and the rotating signal conducting transfer wire. It is preferred to construct the signal conducting brush with a high grade silver coating because of the need to have both electrical signal conduction and high friction wear. A brush material of carbon composition may also be used. The signal conducting brush acts to transfer the signal from the rotating shaft to the stationary housing. The third part of a slip ring is the output lead which has one end electrically connected to the signal conducting brush, and the other to an external signal amplifier.

There are several problems associated with the use of strain gauges and slip rings for measuring the forces applied to rotating marine drive propeller shafts. These problems include small signal output of the strain gauges with relation to high noise interference which is caused by the rotational movement of the strain gauges against the slip ring brushes and a relatively high number of electrical connections. This noise is inherent in this multi-piece configuration and severely limits the sensitivity of this device.

In order to achieve a signal that is higher than the noise created by the slip ring configuration and the amplifier, it is necessary to hollow out the shaft to create a thin walled shaft in the area of strain gauge contact to create higher amplitude signals. However, the hollowed shaft tends to bend which is undesirable in a marine drive propeller shaft and can result in false thrust readings.

A further limitation of the strain gauge and slip ring assembly is that the slip ring is subject to extreme, rapid wear and replacement costs are relatively high.

A further limitation of strain gauges and slip rings is that since the signal output of this gauge is quite low compared to the noise level developed in the slip rings, strain gauges are not effective when only a limited portion of the shaft's thrust exerting surface is available. In other words, the strain gauge and slip ring configuration's signal-to-noise ratio is highly dependent on surface area contact. The lower the contact area, the higher the noise level compared to the signal.

SUMMARY OF THE INVENTION

It is an object of the present invention to provide an improved thrust sensing arrangement for a marine drive unit having one or more propeller shafts and to overcome the aforementioned problems.

It is a further object of the invention to provide an arrangement wherein separate strain gauges and slip rings are not required.

In one aspect of the invention, a one-piece, nonrotational thrust sensing device is provided to gain signal sensitivity of the thrust exerting surface.

In another aspect, the relatively high noise generated by the use of a slip ring is eliminated.

In yet another aspect of the invention, economic advantages are gained in the extended wear of the one-piece, nonrotational thrust sensing device, and still further economic advantages are gained by the replacement of a relatively inexpensive thrust bearing, as opposed to the relatively expensive slip rings when wear is indicated.

In a further aspect of the invention, a thrust sensing arrangement is provided for a marine drive having counter-rotating coaxial concentric propeller shafts.

DETAILED DESCRIPTION OF THE PREFERRED EMBODIMENT

Figure 1:
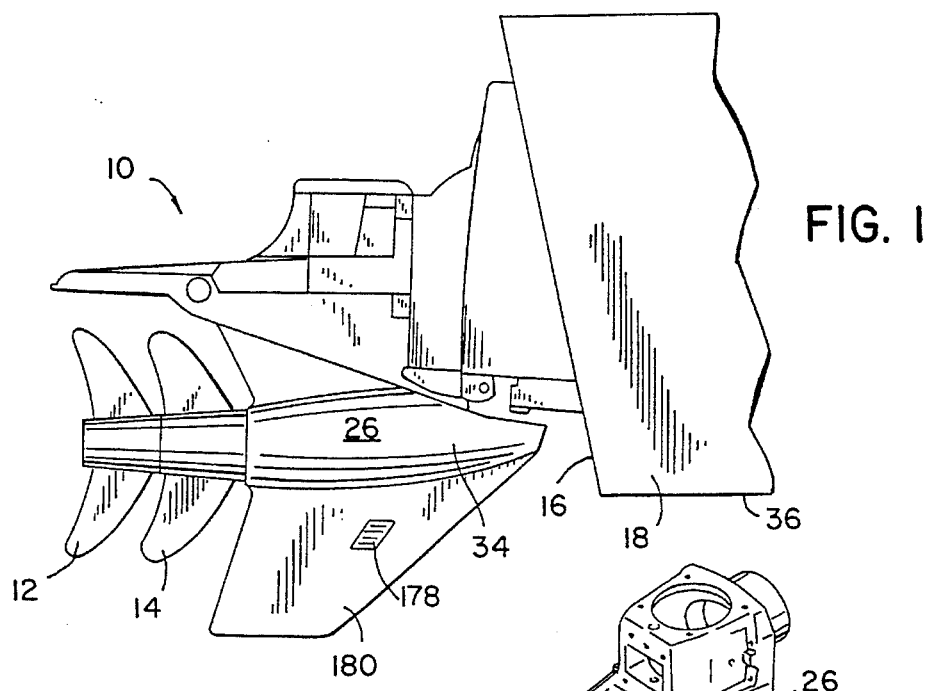
FIG. 1 is a side elevation view of a marine drive.
Figure 4:
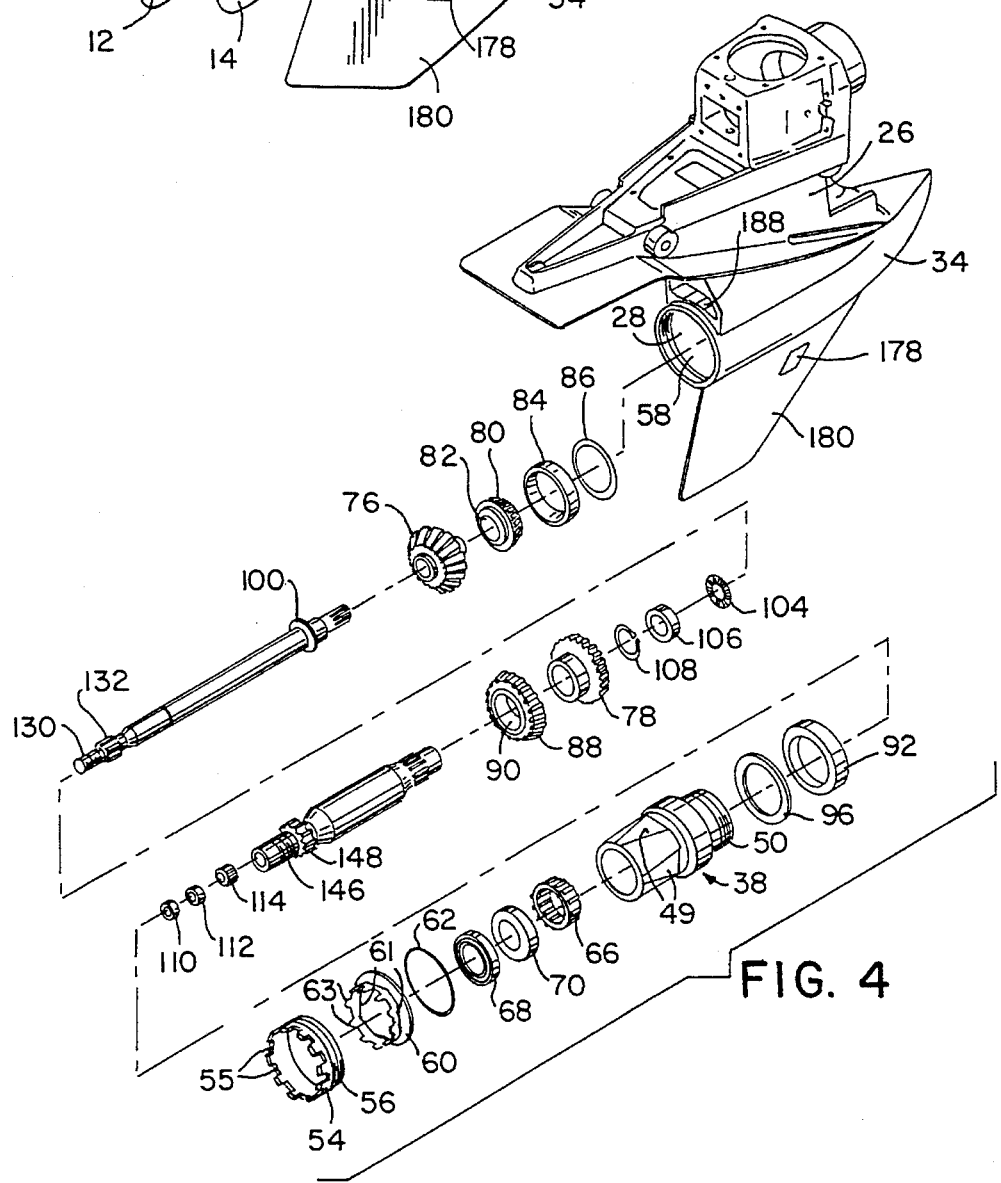
FIG. 4 Is an exploded perspective view of a portion of the structure of FIG. 1.
Figure 2:
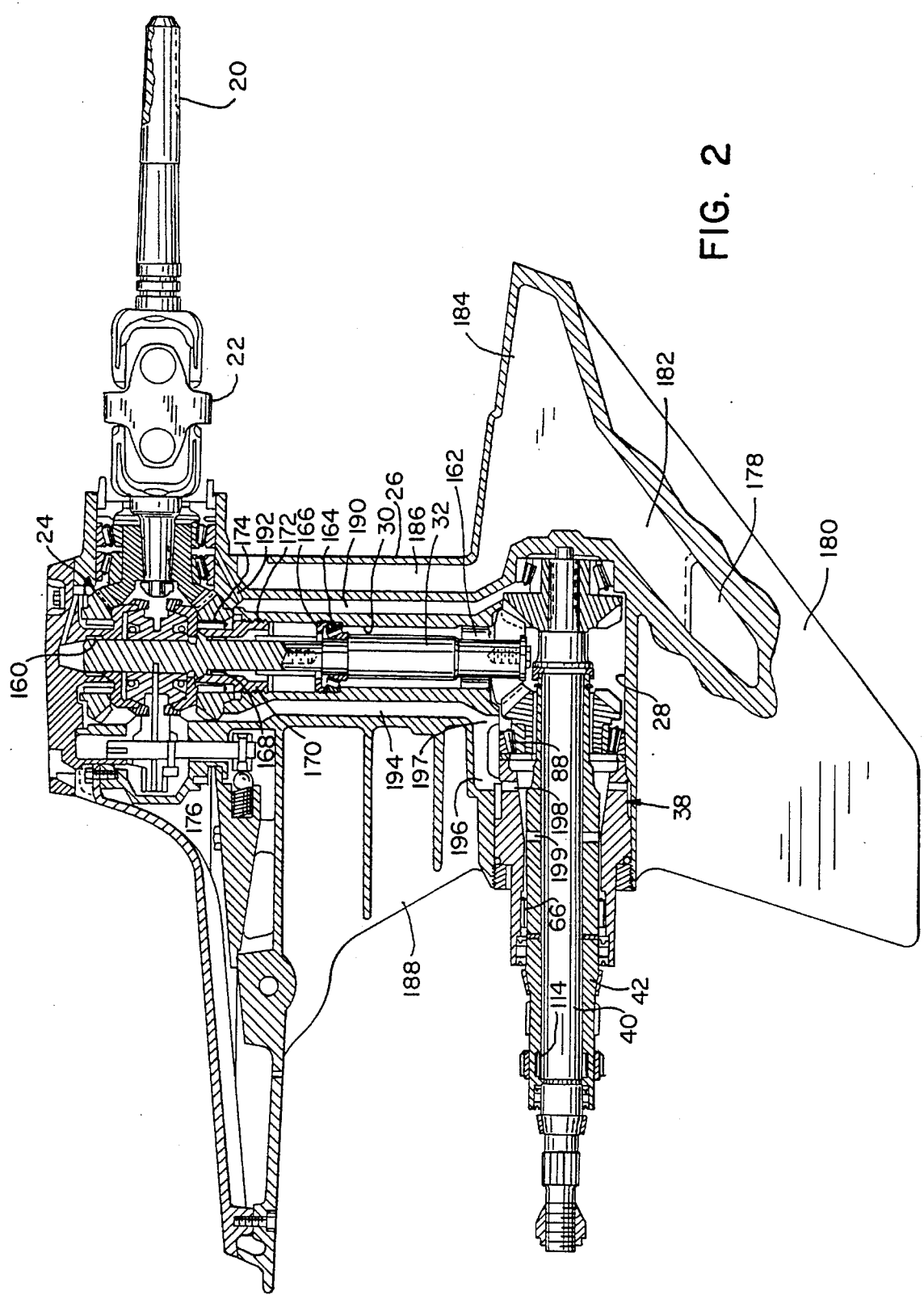
FIG. 2 is a partial sectional view of a portion of the structure of FIG. 1.

FIGS. 1–4 show a marine drive in accordance with U.S. Pat. No. 5,249,995, incorporated herein by reference. FIG. 1 shows a marine drive 10 having two counter-rotating surface operating propellers 12 and 14. The drive is mounted to the transom 16 of a boat 18 according to the usual marine stern drive mounting arrangement. An input shaft 20, FIG. 2, is driven by an engine not shown in the boat. Input shaft 20 is coupled through a universal joint 22 to an upper gear and clutch mechanism 24 which is known in the art, as shown in U.S. Pat. Nos. 4,630,719, 4,679,682, and 4,869,121, incorporated herein by reference. Universal joint 22 allows trimming and steering of the drive.

Figure 3:
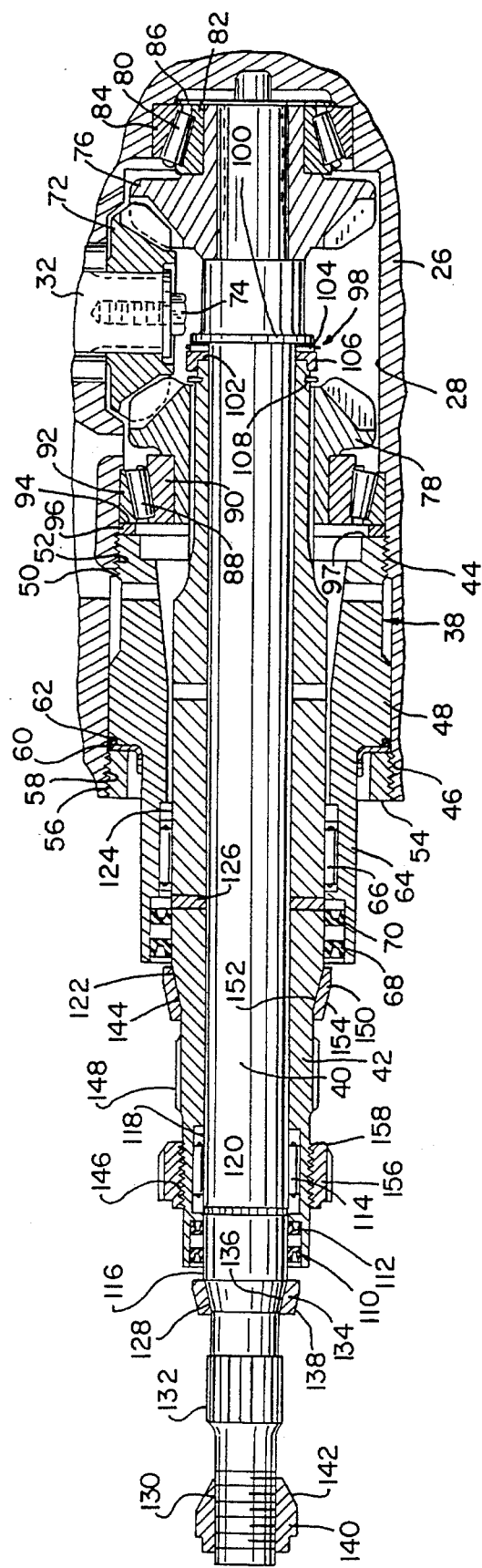
FIG. 3 is an enlarged view of a portion of the structure of FIG. 2.

Drive housing 26 has a horizontal bore 28 and an intersecting vertical bore 30 therein. Upper gear mechanism 24 drives a vertical driveshaft 32 positioned in vertical bore 30. Horizontal bore 28 is in the portion of the drive housing called the torpedo 34, FIG. 4. In the preferred embodiment, FIG. 1, torpedo 34 is spaced slightly above the bottom 36 of the boat such that torpedo 34 is slightly above the surface of the water. A spool assembly 38, FIG. 3, is positioned in horizontal bore 28 of housing 26 and supports a first inner propeller shaft 40 and a second hollow outer propeller shaft 42. Propeller shaft 42 is positioned concentrically over propeller shaft 40. The propeller shafts rotate in opposite rotational directions. Surface operating propeller 12 is mounted to propeller shaft 40. Surface operating propeller 14 is mounted to propeller shaft 42. One of the propellers is a right hand rotating propeller, and the other propeller is a left hand rotating propeller.

Retaining structure is provided for holding the spool assembly 38 fixed for non-rotation within horizontal bore 28 in both rotational directions as the propellers strike and pierce the surface of the water. The retaining structure is provided by a first right hand thread set 44, FIG. 3, and a second left hand thread set 46. The thread sets are spaced along the rotational axis of the propeller shafts. Right hand thread set 44 prevents right hand rotational loosening of the spool assembly. Left hand thread set 46 prevents left hand rotational loosening of the spool assembly. The spool assembly includes a cylindrical bearing support housing 48, FIGS. 3 and 4, having a mounting thread 50 thereon for engagement with a mounting thread 52 in bore 28 of housing 26. The spool assembly also includes a cylindrical ring locking member 54 having a left hand thread 56 for engagement with a mating thread 58 in bore 28 of housing 26, for clamping against bearing support housing 48 to fix the rotational and axial position of both bearing support housing 48 and locking member 54 in horizontal bore 28, whereby rotation of the spool assembly is prevented in each rotational direction. A locking tab washer 60 is provided between locking member 54 and bearing support housing 48, and 0-ring 62 provides a seal between bearing support housing 48 and drive housing 26 preventing entry of water forwardly into bore 28. Flats 61 on washer 60 engage flats 49 on housing 48 to lock the washer 60 against rotation relative to housing 48. Tabs 63 on washer 60 are bent outwardly into slotted recesses 55 on locking member 54 to prevent rotation of member 54 relative to washer 60, which in turn prevents rotation of member 54 relative to housing 48. Housing 48 is then locked into bore 28 by the noted reverse threads 50 and 56. Spool retaining structure for submerged drives using a set screw is known in the prior art, for example U.S. Pat. No. 4,897,058.

The spool assembly includes an aft bearing support portion 64, FIG. 3, extending rearwardly outwardly from housing 26. Needle bearing 66 is positioned between propeller shaft 42 and bearing support housing 48 in extended bearing support portion 64 such that the propeller shafts are supported over a length to prevent bending of the propeller shafts during the surface operation of the propellers as the propellers strike and pierce the surface of the water. Bearings in rearwardly extended spool portions are known in the prior art, for example U.S. Pat. No. 4,897,058. One or more seals 68, 70 are positioned between propeller shaft 42 and extended bearing support portion 64 of the spool assembly and aft of bearing 66 to prevent entry of water forwardly into the space between propeller shaft 42 and the spool assembly.

A pinion driving gear 72, FIG. 3, is mounted on the lower end of vertical driveshaft 32 in splined relation and is held thereon by bolt 74. A fore driven gear 76 is fixed on inner propeller shaft 40 in splined relation and is engaged by pinion gear 72 for drivingly rotating inner propeller shaft 40. An aft driven gear 78 is fixed on outer propeller shaft 42 in splined relation and is engaged by pinion gear 72 for drivingly rotating outer propeller shaft 42 in the opposite rotational direction as inner propeller shaft 40. A tapered roller thrust bearing 80 supports driven gear 76 for rotation in bore 28 of housing 26. Bearing 80 has an inner race 82 engaging gear 76, and an outer race 84 engaging housing 26. A shim 86 may be provided if desired for adjusting axial positioning. A second tapered roller thrust bearing 88 supports the aft driven gear for rotation in bore 28 of housing 26. Bearing 88 has an inner race 90 engaging gear 78, and an outer race 92 engaging housing 26. Outer race 92 has a rearward end portion 94 facing the spool assembly and held thereby against axial movement, to prevent rearward movement of gear 78. Spacer washer 96 is provided between rearward end 94 of outer race 92 and forward end 97 of bearing support housing 48 of spool assembly 38.

A thrust bearing assembly 98, FIG. 3, engages between the propeller shafts such that thrust from outer propeller shaft 42 is transferred to inner propeller shaft 40 during rotation of the propeller shafts in opposite directions. Inner propeller shaft 40 extends through fore driven gear 76 and aft driven gear 78. Outer propeller shaft 42 extends through aft driven gear 78. Inner propeller shaft 40 has an annular shoulder 100 against which the thrust from outer propeller shaft 42 is transferred. Thrust bearing assembly 98 is mounted between shoulder 100 and the forward axial end 102 of outer propeller shaft 42. Thrust bearing assembly 98 is located axially between fore driven gear 76 and aft driven gear 78, such that thrust is transferred from outer propeller shaft 42 to inner propeller shaft 40 at an axial position on the propeller shafts located between gears 76 and 78. Thrust bearing assembly 98 includes a thrust bearing 104 engaging shoulder 100 of inner propeller shaft 40, and an annular cup-shaped thrust member 106 engaging thrust bearing 104 and the forward end 102 of outer propeller shaft 42 to transfer thrust from outer propeller shaft 42 to inner propeller shaft 40. Snap ring 108 stops rearward movement of the shaft in the reverse direction. The propeller shafts are allowed to slide fore and aft within their respective gears 76 and 78 along their respective splines, providing a floating shaft arrangement, without loading the gears. Thrust bearing assembly 98 is a double speed bearing and accommodates the opposite rotational directions of the propeller shafts.

One or more annular seals 110, 112, FIG. 3, are positioned between inner propeller shaft 40 and outer propeller shaft 42 at the propeller mounting end of propeller shaft 40 such that water is prevented from entering forwardly into the space between the propeller shafts. A needle bearing 114 is positioned between inner propeller shaft 40 and outer propeller shaft 42 and forward of seals 110, 112. Propeller shaft 40 has a stainless steel outer surface 116 rearward of seals 110, 112, and a carbon steel outer surface 118 forward of the seals at bearing 114. In one embodiment, inner propeller shaft 40 is a two piece member formed by a forward carbon steel piece and a rearward stainless steel piece welded to each other at a weld joint 120 between bearing 114 and the seals 110, 112. In another embodiment, inner propeller shaft 40 is a stainless steel member having a carbon steel sleeve therearound at bearing 114. Outer propeller shaft 42 has a stainless steel outer surface 122 rearward of seals 68, 70, and a carbon steel outer surface 124 forward of the seals at bearing 66. In one embodiment, outer propeller shaft 42 is a two piece member formed by a forward carbon steel piece and a rearward stainless steel piece welded to each other at a weld joint 126. In another embodiment, outer propeller shaft 42 is a stainless steel member having a carbon steel sleeve therearound at bearing 66.

Self-centering mounting structure is provided for the propellers on each propeller shaft. Inner propeller shaft 40 has a tapered shoulder outer surface 128, FIG. 3, a threaded outer surface 130 axially spaced rearwardly of tapered outer surface 128, and a driving spline 132 therebetween and drivingly engaging propeller 12 in splined relation. An annular ring 134 of a material, e.g. bronze, non-fretting relative to stainless steel, has an inner tapered surface 136 engaging tapered outer surface 128 of inner propeller shaft 40. Ring 134 has a tapered outer surface 138. An internally threaded nut 140 of a material, e.g. bronze, non-fretting relative to stainless steel, threadingly engages threaded outer surface 130 of inner propeller shaft 40. Nut 140 has a tapered outer surface 142. Propeller 12 is mounted on inner propeller shaft 40 between ring 134 and nut 140 and is engaged forwardly at tapered outer surface 138 of ring 134, and is engaged rearwardly at tapered outer surface 142 of nut 140. Tapers 138 and 142 provide a tight self-centering fit and mounting of the propeller to the propeller shaft. Splines 132 do not provide a tight fit, but merely rotational drive.

Outer propeller shaft 42 has a tapered shoulder outer surface 144, FIG. 3, a threaded outer surface 146 axially spaced rearwardly of tapered outer surface 144, and a driving spline 148 therebetween for drivingly engaging propeller 14 in splined relation. A ring 150 of a material, e.g. bronze, non-fretting relative to stainless steel, has a tapered inner surface 152 engaging tapered outer surface 144 of outer propeller shaft 42. Ring 150 has a tapered outer surface 154. An internally threaded nut 156 of a material, e.g. bronze, non-fretting relative to stainless steel, threadingly engages threaded outer surface 146 of outer propeller shaft 42. Nut 156 has a tapered outer surface 158. Propeller 14 is mounted on outer propeller shaft 42 between ring 150 and nut 156 and is engaged forwardly at tapered outer surface 154 of ring 150, and is engaged rearwardly at tapered outer surface 158 of nut 156. Tapers 154 and 158 provide a tight self-centering fit. Splines 148 do not provide a tight fit, but only rotational drive.

Vertical driveshaft 32, FIG. 2, is supported at its top end by a needle bearing 160 as in the above incorporated patents. The driveshaft is supported at its lower end by a needle bearing 162. Driveshaft 32 is centrally supported in bore 30 by tapered roller thrust bearing 164 retained by threaded ring 166. Driveshaft 32 is also supported by needle bearing 168 in upper spool 170 mounted at threads 172 in bore 30, and also having a needle bearing 174 supporting gear 176 of upper gear assembly 24. Reference is made to U.S. Pat. No. 5,230,644, incorporated herein by reference.

Cooling water for the engine is supplied from water intake 178 in skeg 180. The water flows through skeg passage 182, torpedo nose passage 184 and then through housing passage 186 and then to the engine in the usual manner. After cooling the engine, the water and the engine exhaust are exhausted in the usual manner through an exhaust elbow and through the drive housing and are discharged at exhaust outlet 188 above torpedo 34 and into the path of the propeller blades in the upper portion of their rotation, as in U.S. Pat. No. 4,871,334.

Oil circulates from the lower gears upwardly through passages 190 and 192 to the upper gears and then downwardly through passage 194 to the lower gears at passages 196 and 197. Passage 196 supplies oil through passage 198 in the spool assembly to bearings 88 and 66, and through passage 199 in outer propeller shaft 42 to bearing 114. Passage 197 supplies oil to the forward end of bearing 88.

Figures 5, 8:
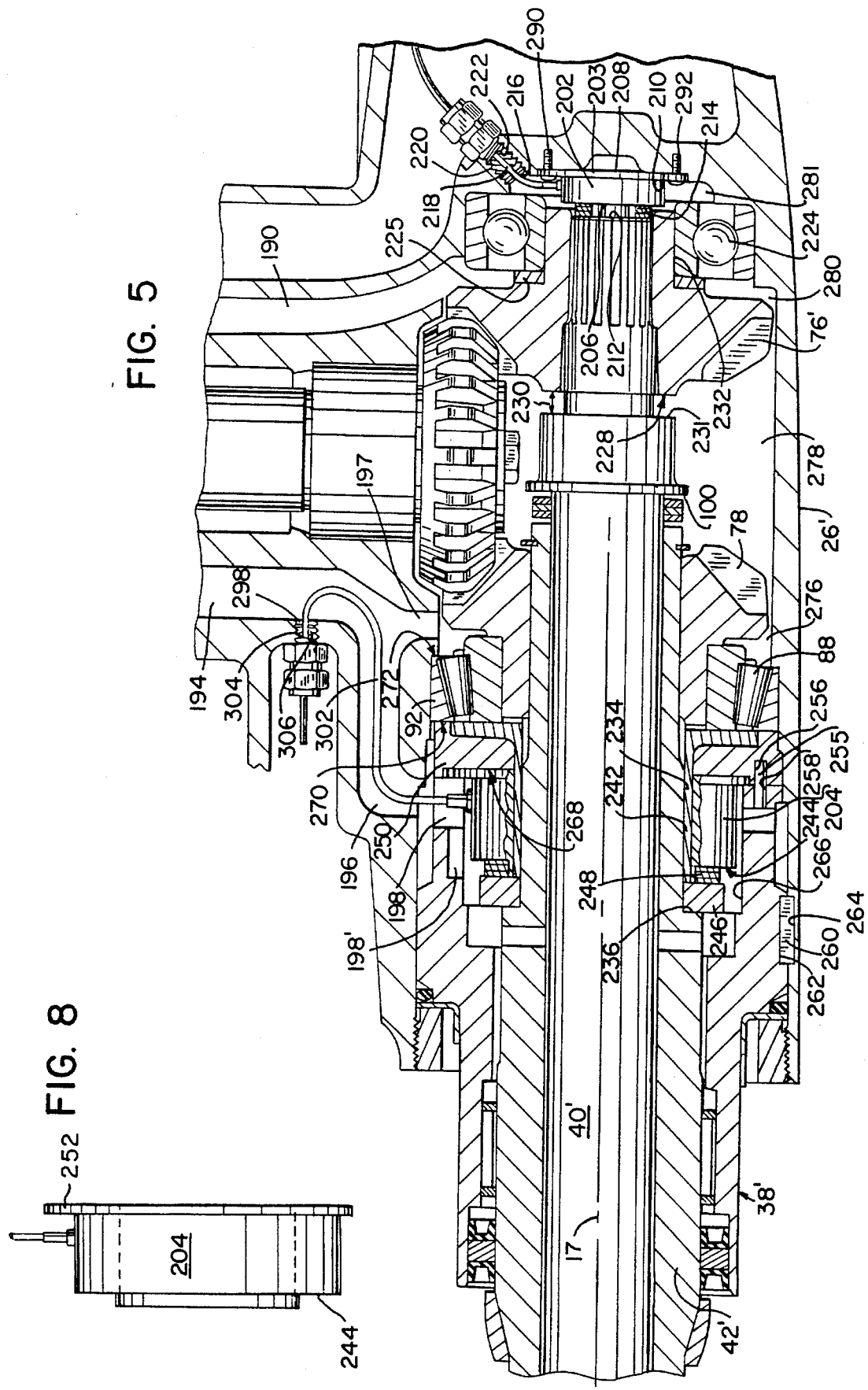
FIG. 5 is similar to FIG. 3, and shows the present invention.
FIG. 8 is a side elevation view of a portion of the structure of FIG. 5.

FIG. 5 shows various modifications made to the above described apparatus to accommodate two nonrotational thrust sensing devices 202, 204. To provide a clear understanding of these modifications, the same reference characters are used from above, but where a component was modified, the reference character is denoted by the addition of the prime character. For example, the drive housing 26, FIG. 3, was modified and is depicted as drive housing 26' FIG. 5.

As shown in FIG. 5, a one-piece, solid, non-rotational thrust sensing device 202, commonly known as a load cell, is situated such that its load sensing surface 206 is rearwardly facing and the non-load sensing surface 208 is forwardly facing and in direct contact with housing 26' at thrust surface 210. A thrust bearing 214 is confined between the rearwardly facing load surface 206 of load cell 202 and the thrust exerting surface 212 at the forward end of propeller shaft 40'. Surface 212 was machined to shorten shaft 40' to accommodate load cell 202 and bearing 214.

Figure 6:
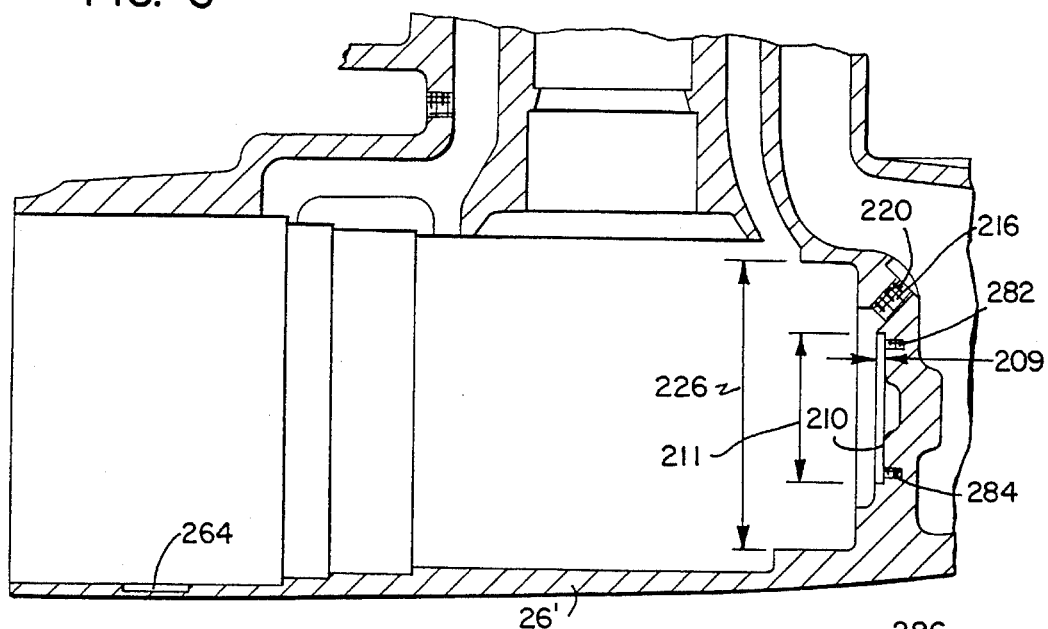
FIG. 6 is a sectional view of the drive housing of FIG. 5.
Figure 7:
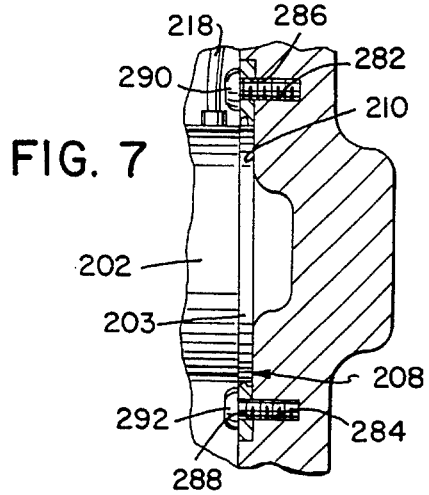
FIG. 7 is an enlarged view of a portion of the structure of FIG. 5.

To further accommodate load cell 202, housing 26' was modified, as shown in FIG. 6, by machining thrust surface 210 to diameter 211 to provide a flat, recessed mounting surface for load cell 202. Surface 210 was machined to depth 209, equal to the width of flange 203, FIG. 7, of load cell 202, and to diameter 211, FIG. 6, which is slightly larger than the diameter of flange 203 of load cell 202. Housing 26' was drilled and threadingly tapped to provide retention holes 282 and 284, FIG.7. Load cell 202 is equipped with holes 286 and 288 to accommodate retention screws 290 and 292. Load cell 202 is held nonrotational by retention screws 290 and 292, which are placed through load cell holes 286 and 288 and threadingly attached to housing retention holes 282 and 284, respectively.

Housing 26' also was drilled and threadedly tapped to provide passage 216, FIG.6, for external connection of the load cell's lead wires 218, FIG. 5. Threads 220 provide for an oil seal between housing 26' and threaded compression fitting 222. Tapered roller thrust bearing 80, FIG. 3, was replaced with ball bearing 224, FIG. 5, to transfer radial loads to housing 26' but not axial, longitudinal loads. Housing 26' was machined to diameter 226, FIG. 6, to accept ball bearing 224, FIG. 5. Spacer 225 is used to compensate for the width difference between the original thrust bearing 80 and the replacement ball bearing 224.

Fore driven gear 76', FIG. 5 was modified by machining material from surface 228 to allow axial clearance 230 between gear 76' and inner propeller shaft 40' at shoulder 231, to prevent transfer of thrust from inner propeller shaft 40' to load cell 202. Gear surface 232 was machined to accept bearing 224.

In this manner, the thrust created by propeller 12, FIG. 1, mounted on inner propeller shaft 40', FIG. 5, is of equal magnitude to the force applied to the opposite end of inner propeller shaft 40' against drive housing 26' and is sensed by load cell 202 through bearing 214. In this preferred embodiment, the wear associated with the exertion of force on load cell 202 is absorbed by bearing 214. Lubrication is provided to bearings 214 and 224 by oil passages 194, 197, 276, cavity 278 and passages 280 and 281. The oil is then re-circulated through passage 190 as above described, and for which further reference may be found in U.S. Pat. No. 5,236,380, incorporated herein by reference. Therefore, the service life of this configuration is further extended over that of a strain gauge and slip ring arrangement.

As shown in FIG. 5, outer propeller shaft 42' does not have the solid end surface of inner propeller shaft 40'. A different arrangement is therefore provided for sensing the propeller thrust of outer propeller shaft 42'. Specifically, a stepped radius reduction is machined into propeller shaft 42' by machining surface 234 which provides a thrust exerting surface 236. Thrust bearing assembly 98 of FIG. 3 is eliminated in FIG. 5 so that the thrust from the outer propeller shaft 42' at forward end 102 is not transferred to the inner propeller shaft at annular shoulder 100. This allows complete outer shaft thrust transfer at surface 236.

Load cell 204 is ring-shaped with an inner diameter which is slightly larger than the propeller shaft's outer diameter to allow clearance 242 between rotating shaft 42' and nonrotating load cell 204. Load cell 204 encircles propeller shaft 42' and is situated such that the load sensing surface 244 is rearwardly facing.

Thrust ring 246 is placed forward of, and in contact with, outer propeller shaft thrust exerting surface 236 and rearward of load cell 204. Thrust bearing 248 is situated between load sensing surface 244 of load cell 204 and thrust ring 246.

Figure 9:
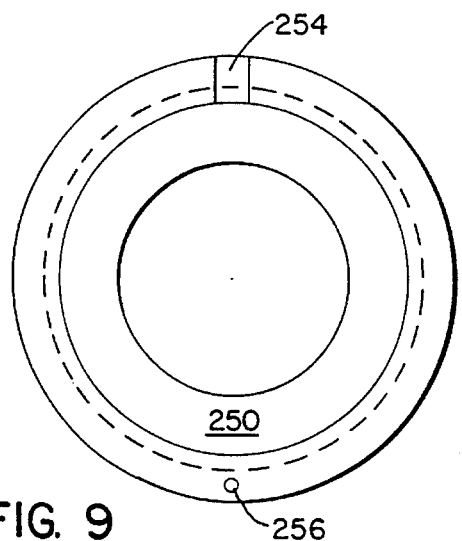
FIG. 9 is a rear elevation view of a portion of the structure of FIG. 5.

Spacer washer 96, FIG. 3, was replaced with adapter 250. Load cell 204 is interconnected with adapter 250 by tab 252, FIG. 8, of the load cell. Tab 252 fits into slot 254 of adapter 250, FIG. 9, to hold load cell 204 nonrotational with respect to adapter 250. Referring back to FIG. 5, the load cell and adapter combination are held nonrotational with respect to spool 38' by cylindrical dowel pin 255. The forward half of dowel pin 255 is press fit into corresponding hole 256, FIGS. 5 and 9, of adapter 250 and the rearward half is slip-fit into corresponding hole 258, FIGS. 5 and 10, of spool 38' to form a nonrotational combination.

Figure 10:
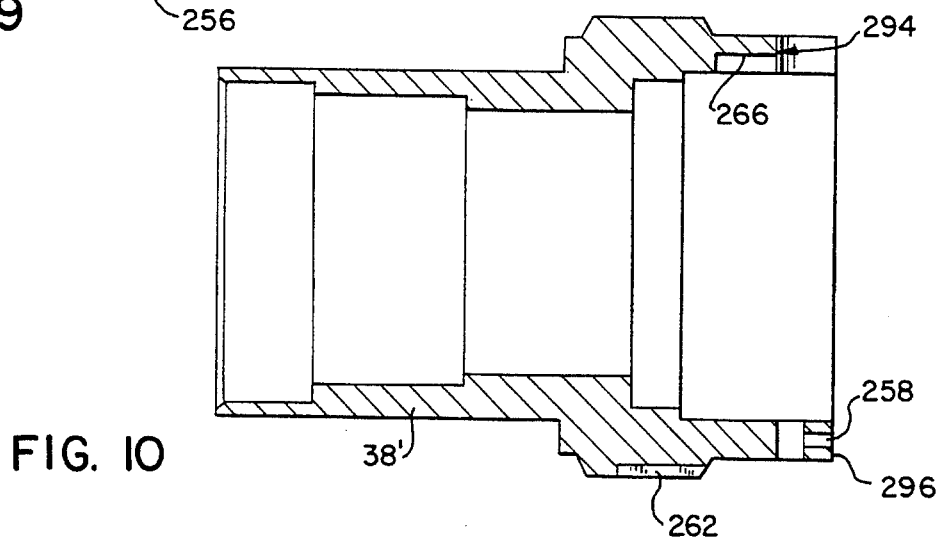
FIG. 10 is a sectional view of a portion of the structure of FIG. 5.

Spool 38', FIG. 5, is held nonrotational with respect to housing 26' by key 260. Keyway 262, FIG. 10, is machined into spool 38' to accept key 260, and a corresponding keyway 264, FIG. 6, is machined into housing 26'. Screw threads 50 of spool 38, FIG. 3, and matching screw threads 52 of housing 26 were removed to allow spool 38' to slip into housing 26' as opposed to screwing in. In this manner, key 260, FIG. 5, and keyways 262 and 264 lock spool 38' nonrotational with housing 26'. Spool 38' was also shortened at surfaces 294 and 296 to accommodate adaptor 250.

Thrust ring 246 is provided to expand the thrust exerting surface area 236 of propeller shaft 42' and to transfer thrust force to bearing 248. Bearing 248 transfers axial longitudinal forces and is confined between the load surface 244 of load cell 204 and thrust ring 246. Adapter 250 is provided to hold load cell 204 nonrotational and provide solid contact with housing 26' through outer race 92 of thrust bearing 88 at contact points 268, 270, and 272.

Bearing 248 is lubricated by oil passages 194 and 196 in housing 26' and oil passages 198 and 198' in spool 38', thereby providing extended service life of bearing 248 and accompanying surfaces. Oil passage 198' in spool 38' was enlarged at surface 266, FIGS. 5 and 10, to provide sufficient oil around load cell 204.

Housing 26' also was drilled and threadedly tapped to provide passage 298, FIG. 5, for external connection of the load cell 204 lead wires 302. Threads 304 provide for an oil seal between housing 26' and threaded compression fitting 306.

The thrust developed by the rotation of propeller 14, FIG. 1, is of equal magnitude to the force applied to the opposite end of propeller shaft 42', FIG. 5, against drive housing 26' and is transmitted at thrust exerting surface 236, FIG. 5, of propeller shaft 42' to thrust ring 246, through bearing 248, to load sensing surface 244 of load cell 204 which is held nonrotational with housing 26' by adapter 250, pin 254, spool 38' and key 260.

In operation, the load cells convert the longitudinal energy forces created by the propellers, into electrical signals which are indicative of the thrust applied by each marine propeller. The electrical signals are monitored by external apparatus. In accordance with this preferred embodiment, marine propeller thrust is recorded accurately and individually for each propeller. In this manner, a method of measuring thrust force exerted by a propeller 12, 14 connected to a propeller shaft 40' 42' within a housing 26' of a marine drive 10 is disclosed comprising sensing an opposite force applied to the marine drive housing 26' by a thrust exerting surface 212, 236 of the rotating propeller shaft 40', 42' upon a nonrotating thrust sensing device 202, 204.

It is noted that the load cells used in this specification may be any type of pressure sensing means including, but not limited to, a transducer or a piezoelectric device. In the preferred embodiment, load cell 204 is a Sensotech Part No. 8306-01, and load cell 202 is a Sensotech Part No. 8307-01.

A significant aspect of the present invention is the provision of a thrust sensing arrangement for a marine drive having counterrotating coaxial propeller shafts including an inner propeller shaft 40', and an outer propeller shaft 42' concentrically surrounding the inner propeller shaft, each propeller shaft having a thrust exerting propeller mounted thereto. Thrust sensor 202 senses the thrust of inner propeller shaft 40' during counterrotation of inner and outer propeller shafts 40' and 42'. Thrust sensor 204 senses the thrust of outer propeller shaft 42' during counterrotation of inner and outer propeller shafts 40' and 42'. Thrust sensors 202 and 204 individually sense the thrust of inner and outer propeller shafts 40' and 42', respectively, to provide separate sensed thrust for each of the inner and outer propeller shafts.

It is further recognized that other various equivalents, alternatives, and modifications are possible within the scope of the appended claims.

We claim:

1. In a marine drive, the combination comprising:

(a) a generally vertical gear casing terminating in a lower generally horizontal fore-to-aft extending housing, (b) a propeller shaft disposed within the housing for rotation about a longitudinal drive axis, the propeller shaft having a thrust exerting surface at a fore end of the propeller shaft, (c) a thrust exerting propeller connected to the propeller shaft at an aft end of the propeller shaft, (d) a one-piece nonrotational electrical thrust sensing device confined between the thrust exerting surface of the propeller shaft and the housing such that sensing is restricted in an axial, longitudinal direction with respect to the propeller shaft; and (e) a retention means for retaining the thrust sensing device to the housing and providing said nonrotational characteristic, the retention means comprising at least one male retention member and at least one corresponding retention hole for receiving the male retention member therein.

2. The combination of claim 1 having a bearing between the thrust exerting surface and the one-piece nonrotational electrical thrust sensing device.

3. The combination of claim 1 which includes:
   (a) a second propeller shaft disposed within the housing for rotation about the axis, the second propeller shaft being concentric with the first propeller shaft and having a thrust exerting surface,
   (b) a second thrust exerting propeller connected to the second propeller shaft,
   (c) a second one-piece nonrotational electrical thrust sensing device confined between the housing and the thrust exerting surface of the second propeller shaft.

4. The combination of claim 3 having a bearing between the thrust exerting surface of the second propeller shaft and the second one-piece nonrotational electrical thrust sensing device.

5. The combination of claim 3 having an adapter situated between the housing and the second one-piece nonrotational electrical thrust sensing device.

6. The combination of claim 3 having a thrust ring situated between the thrust exerting surface of the second propeller shaft and the second one-piece nonrotational electrical thrust sensing device.

7. The combination of claim 6 having a bearing between the thrust ring and the second one-piece nonrotational electric thrust sensing device.

8. The combination of claim 3 wherein the second one-piece nonrotational electrical thrust sensing device encircles the second propeller shaft.

9. The combination of claim 1 wherein the one-piece nonrotational electrical thrust sensing device senses an axial, longitudinal force of the propeller shaft on the housing, for sensing the thrust created by the thrust exerting propeller.

10. The combination of claim 1 wherein the thrust exerting surface of the propeller shaft is at a forward end of the propeller shaft and the one-piece nonrotational electrical thrust sensing device is confined between a forward portion of the housing and the thrust exerting surface of the propeller shaft.

11. The combination of claim 3 wherein the second one-piece nonrotational electrical thrust sensing device senses an axial, longitudinal force of the second propeller shaft on the housing, for sensing the thrust created by the second thrust exerting propeller.

12. The combination of claim 3 wherein the housing has a central portion and wherein the thrust exerting surface of the second propeller shaft is located forward of the rearward end of the second propeller shaft along the longitudinal length of the second propeller shaft and the second one-piece nonrotational electrical thrust sensing device disposed between the central portion of the housing and the thrust exerting surface of the second propeller shaft.

13. The combination of claim 1 wherein the housing has a forward end and wherein the propeller shaft exerts radial loads in the forward end of the housing, and further comprising:
   a ball bearing disposed within the forward end of the housing to transfer only the radial loads from the propeller shaft to the housing;
   an oil passage to lubricate the ball bearing;
   the one-piece nonrotational electrical thrust sensing device having a lead wire;
   the lead wire having an external connection;
   the housing having a threaded passage to accommodate the external connection of the lead wire; and
   a threaded compression fitting engaged within the threaded passage to provide an oil seal between the threaded passage and the oil passage of the housing.

14. The combination of claim 3 wherein a stepped radius reduction in the longitudinal length of the second propeller shaft provides the thrust exerting surface of the second one-piece propeller shaft and the second nonrotational electric thrust sensing device is situated in the housing forward of the stepped radius reduction of the second propeller shaft.

15. The combination of claim 3 wherein the housing has a forward end and wherein the first propeller shaft exerts radial loads in the forward end of the housing, and further comprising:
   a ball bearing disposed within the forward end of the housing to transfer only the radial loads from the first propeller shaft to the housing;
   an oil passage to lubricate the ball bearing;
   the first one-piece nonrotational electric thrust sensing device having a lead wire;
   the lead wire having an external connection;
   the housing having a threaded passage to accommodate the external connection of the lead wire;
   a threaded compression fitting engaged within the threaded passage to provide an oil seal between the threaded passage and the oil passage of the housing;
   a stepped radius reduction in the longitudinal length of the second propeller shaft providing the thrust exerting surface of the second propeller shaft;
   the second one-piece nonrotational electrical thrust sensing device situated in the housing forward of the stepped radius reduction of the second propeller shaft;
   a spool assembly situated between the housing and the second propeller shaft and engaging the housing to provide nonrotation of the spool assembly;
   an adapter situated between the spool assembly, the housing, and the second one-piece nonrotational electrical thrust sensing device and engaging the second one-piece nonrotational electrical thrust sensing device with the spool assembly to provide nonrotation of the second nonrotational thrust sensing device;
   a thrust ring situated between the thrust exerting surface of the second propeller shaft and the second nonrotational thrust sensing device;
   a bearing between the thrust ring and the second nonrotational thrust sensing device; and
   an enlarged oil passage providing lubrication to the bearing and the thrust ring.

16. In a marine drive, the combination comprising:
   a generally vertical gear casing terminating in a lower generally horizontal fore-to-aft extending housing having a forward end;
   a propeller shaft disposed within the housing for rotation about a longitudinal drive axis, the propeller shaft having a thrust exerting surface and wherein the propeller shaft exerts radial loads in the forward end of the housing;
   a thrust exerting propeller connected to the propeller shaft;
   a nonrotational thrust sensing device confined between the thrust exerting surface of the propeller shaft and the housing;
   a ball bearing disposed within the forward end of the housing to transfer only the radial loads from the propeller shaft to the housing;

an oil passage to lubricate the ball bearing;

the nonrotational thrust sensing device having a lead wire;

the lead wire having an external connection;

the housing having a threaded passage to accommodate the external connection of the lead wire; and a threaded compression fitting engaged within the threaded passage to provide an oil seal between the threaded passage and the oil passage of the housing.

17. In a marine drive, the combination comprising:

a generally vertical gear casing terminating in a lower generally horizontal fore-to-aft extending housing having a forward end;

a first propeller shaft disposed within the housing for rotation about a longitudinal drive axis, the first propeller shaft having a thrust exerting surface and wherein the first propeller shaft exerts radial loads in the forward end of the housing;

a thrust exerting propeller connected to the first propeller shaft;

a nonrotational thrust sensing device confined between the thrust exerting surface of the propeller shaft and the housing;

a second propeller shaft disposed within the housing for rotation about the axis, the second propeller shaft being concentric with the first propeller shaft and having a thrust exerting surface;

a second thrust exerting propeller connected to the second propeller shaft;

a second nonrotational thrust sensing device confined between the housing and the thrust exerting surface of the second propeller shaft;

a ball bearing disposed within the forward end of the housing to transfer only the radial loads from the first propeller shaft to the housing;

an oil passage to lubricate the ball bearing;

the first nonrotational thrust sensing device having a lead wire;

the lead wire have an external connection;

the housing having a threaded passage to accommodate the external connection of the lead wire;

a threaded compression fitting engaged within the threaded passage to provide an oil seal between the threaded passage and the oil passage of the housing;

a stepped radius reduction in the longitudinal length of the second propeller shaft providing the thrust exerting surface of the second propeller shaft;

the second nonrotational thrust sensing device situated in the housing forward of the stepped radius reduction of the second propeller shaft;

a spool assembly situated between the housing and the second propeller shaft and engaging the housing to provide nonrotation of the spool assembly;

an adapter situated between the spool assembly, the housing, and the second nonrotational thrust sensing device and engaging the second nonrotational thrust sensing device with the spool assembly to provide nonrotation of the second nonrotational thrust sensing device;

a thrust ring situated between the thrust exerting surface of the second propeller shaft and the second nonrotational thrust sensing device;

a bearing between the thrust ring and the second nonrotational thrust sensing device; and an enlarged oil passage providing lubrication to the bearing and the thrust ring.

* * * * *